P. O. NOBLE.
ELECTRIC WELDING.
APPLICATION FILED MAY 6, 1918.

1,310,131.

Patented July 15, 1919.

Inventor:
Paul O. Noble,
by Albert G. Davis
His Attorney

UNITED STATES PATENT OFFICE.

PAUL O. NOBLE, OF SCHENECTADY, NEW YORK, ASSIGNOR TO GENERAL ELECTRIC COMPANY, A CORPORATION OF NEW YORK.

ELECTRIC WELDING.

1,310,131.   Specification of Letters Patent.   Patented July 15, 1919.

Application filed May 6, 1918. Serial No. 232,743.

*To all whom it may concern:*

Be it known that I, PAUL O. NOBLE, a citizen of the United States, residing at Schenectady, in the county of Schenectady, State of New York, have invented certain new and useful Improvements in Electric Welding, of which the following is a specification.

The present invention comprises an improved method of and apparatus for arc welding, and it is the object of my invention to improve the character and strength of the weld and to economize the consumption of electric energy.

Heretofore electric arc welding has been carried out by either the constant potential system or the constant current system. In the former system the welding terminals are connected in series with a resistance to a constant potential source of current and in the latter system a resistance regulator is interposed between the source of current and the welding terminals which is intended to maintain constant current in the welding circuit. Both systems are wasteful of energy because of the presence of an energy-consuming resistance in the line and do not give the best conditions for arc welding. A constant current system particularly, the maintenance of constant current in an arc of variable length, necessitates a variable energy consumption and therefore variable temperature at the arc. In the constant potential system having a series-connected energy-consuming resistance, the energy consumption is less variable but only so in proportion to the size of the resistance and hence in proportion to the waste of energy.

My experiments have demonstrated that best results in arc welding are obtained by regulating the voltage and amperage of the current in the welding circuit inversely so that the wattage or energy consumption in the arc is substantially constant. In the preferred embodiment of my invention, hereinafter more fully disclosed, the welding current is modified by varying the amperage and voltage of the current inversely to maintain the energy of the welding current substantially constant without any external energy-consuming resistance.

Figure 1:
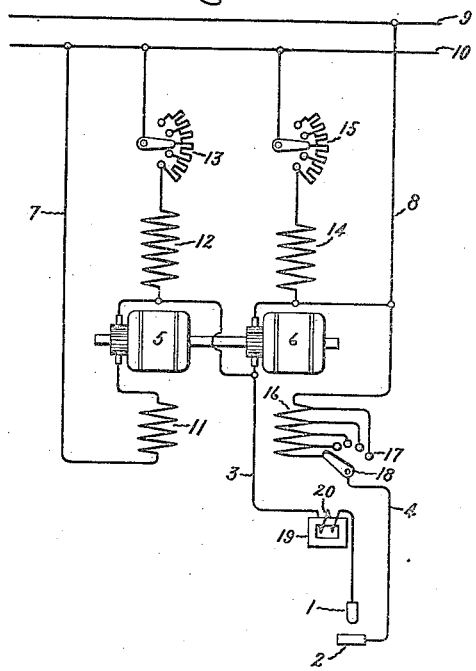
Figure 2:
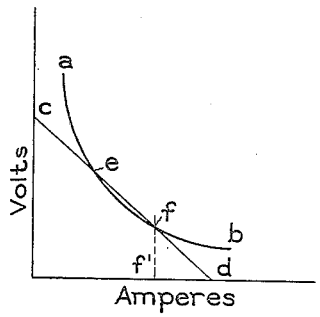

The novel features of my invention will be pointed out with particularity in the appended claims and the details of my invention will be more fully understood by reference to the following specification taken in connection with the accompanying drawing in which Figure 1 illustrates diagrammatically a welding system embodying my invention, and Fig. 2 is a curve illustrating current and voltage relations in a constant energy system.

Referring to the drawing the welding terminals 1 and 2 are connected by conductors 3 and 4 to a balancer set including a motor 5 and a generator 6 having their armatures connected in series and deriving power through conductors 7, 8 from a source of direct current of constant characteristic represented by supply mains 9 and 10. I may use, for example, a constant potential circuit of 125 volts, the motor operating at about 65 to 110 volts and the generator at about 60 to 15 volts. The electrode 1 is intended to represent a movable welding rod or wire which is manually controlled by the welding operator and is preferably connected to the negative terminal. The terminal 2 connected to the positive terminal is intended to represent the work on which the welding operation is carried out, although in some cases both the electrodes may consist of rods between which the welding arc plays, the melted metal derived from the electrodes or the heat derived from the arc being transferred to work which is not included in the circuit.

The motor 5 has a field winding 11 connected in series with the armature and a field winding 12 connected accumulatively in shunt to the motor armature in series with an adjustable regulating resistance 13. The generator 6 has a separately excited field winding 14 connected across the source of current 9, 10, in series with the regulating resistance 15 and an opposing field winding 16 connected in series with the welding arc. The field winding 16 is provided with a number of taps brought to contacts 17 into which a switch 18 may be moved into engagement, thereby connecting the welding conductor 4 in series with a desired number of sections of the field winding 16. In order to smooth out fluctuations in the welding current a small amount of reactance is provided in series with the welding arc. The drawing shows magnetic core 19 having a winding 20 connected in series with the welding arc.

One of the objects of my invention is to supply energy to a welding circuit having an arc of variable length, in such manner that the energy consumption in the circuit will be substantially constant. The constant energy curve with the current of varying voltage and amperage would have an equation of $EI=K$ where E is voltage, I is amperage, and K is a constant. This is the equation of a hyperbola, part of which may be represented by $a$, $b$, in Fig. 2. It would be impossible to obtain a current having these characteristics over an unlimited range, as it would require infinite amperage at one extreme and infinite volts at the other extreme, but it is possible to provide a source of current having substantially constant energy within the limits of voltage desired for commercial welding. A skilled operator can maintain the voltage of a welding arc at approximately 18 or 20 volts and never draw the arc so long as to get higher than 25 volts or operate with an arc so short as to require less than about 15 volts. Over this limited range of voltages desired for common welding practice an electric current may be furnished by my apparatus, the voltage and amperage of which will vary inversely in a constant energy relation.

In the curve diagram of Fig. 2, if the abscissa represents amperes and the ordinate volts, the curve $c$, $d$, will represent such a curve obtainable in accordance with my invention. This curve will intersect the constant energy curve $a$, $b$, at two points, $e$ and $f$ representing the welding voltage extremes used in commercial practice. Between these limits the curve $c$, $d$, coincides substantially with hyperbola $a$, $b$, and hence over the given range the energy of the welding current will be substantially constant. The described apparatus possesses the added advantageous function of suppressing the tendency of a welding arc to fluctuate abruptly in its characteristic and thereby increases the smoothness of the welding operation. As the generator field winding 16 is in inductive relation with the field winding 14, a sudden change of current in the winding 16 will induce current in the opposite direction in the winding 14 by a transformer effect, thereby retarding the change or smoothing out the current. Suppose, for example, a welding arc is being operated with a current corresponding to $f'$ on the abscissa of the diagram Fig. 2. A slow change of current would follow the curve $c$—$d$ but a rapid change of current will more nearly follow the constant-energy curve $a$—$b$ due to electromagnetic relation of the windings 14 and 16.

In the described system the initial voltage for striking the arc and the average current for the welding operation may be regulated at the desire of the operator by adjusting the resistance 15, in circuit with the field winding 14 of the generator, and adjusting by switch 18 the number of turns in the differential field 16 traversed by the welding current. After the arc is established the variations in relative values of amperage and voltage of the welding current will change with the relative positions of the electrode and work, following a fixed law, which tends to produce a homogeneous weld. This variation is obtained without the use of any energy-consuming devices and is entirely inherent to the apparatus itself.

For example, when the welding arc is lengthened due to the unavoidable instability of the operator's hand, or for any other reason, the voltage necessary to maintain the arc increases, the current through the generator field winding 14 decreases, and as the field windings 14 and 16 are differential, the effect of this is to increase the excitation of the generator raising the voltage at its terminals. At the same time the excitation of the field winding 12 of motor 5 decreases due to a decrease of voltage across the motor armature. As the sum of the motor and generator voltages is constant, these machines being connected across a source of constant potential, the motor armature voltage must decrease as the generator voltage increases. This would cause a proportionate decrease of motor speed, were it not for the fact that the excitation of the field winding 12 also decreases, tending to maintain the motor speed approximately constant. The net effect is to increase the voltage and decrease the amperage of the welding current in such manner as to maintain the energy consumption in the arc substantially constant. Conversely if the length of the arc is decreased by the operator, the excitation of the generator is decreased and the voltage of the motor is increased, the net effect being to decrease the voltage and increase the amperage of the welding current to maintain substantially constant energy in the welding circuit.

As there is no series regulating resistance in the welding circuit and there is only a comparatively small loss of power in the motor generator set the operating efficiency of my apparatus is very materially higher than in a system in which energy is wasted in regulating resistances.

The resulting advantages of my apparatus include not only a saving of electric energy but improved welds as within the working range of voltage the heating effect of the arc is substantially constant, with greater steadiness of arc than obtainable with a regulating resistance.

What I claim as new and desire to secure by Letters Patent of the United States is:—

1. The method of electric arc welding which consists in regulating the amperage and voltage of the welding current inversely with respect to each other to maintain substantially constant energy in the arc.

2. The method of supplying energy to an electric welding circuit in which an arc of variable length is maintained which consists in charging the circuit from a source of electric current of constant characteristic and modifying said current in accordance with the variations of resistance in said arc to vary the amperage and voltage of said current inversely with respect to each other in order to maintain the energy consumption in said arc substantially constant.

3. An electric arc-welding apparatus comprising a welding circuit containing an arc-supporting electrode and means connected directly to said circuit adapted to deliver welding current, the amperage and voltage of which vary inversely in substantially constant energy relation over a given range.

4. An electric arc-welding apparatus comprising a welding circuit, a constant potential circuit electrically connected to said circuit and a balancer comprising a motor and generator connected to modify current derived from said circuit to maintain the amperage and voltage in said welding circuit in substantially constant energy relation.

5. The combination with a source of current of constant potential, of a balancer comprising a motor and a generator, the armatures of said motor and said generator being connected in series across said source, a series field winding and a shunt field winding for said motor, said shunt field winding being connected across the armature of said motor and said series field winding being connected accumulatively with respect to said shunt field winding, a separately excited field winding and a series field winding for said generator, said series field winding of said generator being connected differentially with respect to said separately excited field winding, and a circuit containing arcing electrodes, said circuit being connected across the armature of the generator and in series with the series field winding of the generator.

6. An electric arc welding apparatus comprising a welding circuit containing an arc-supporting electrode and a source of electrical energy connected directly to said circuit, said source comprising the combination of means for regulating the voltage and current inversely with respect to each other in a substantially constant energy relation in response to the rapid changes of resistance encountered in a welding arc within a given range of welding voltages.

7. An electric arc welding apparatus comprising a welding circuit, a source of electric energy of constant characteristic connected to deliver energy to said circuit, and electrodynamic means connected in series with said source to modify energy derived from said source to maintain the amperage and voltage of current in said welding circuit in substantially constant energy relation.

In witness whereof, I hereunto set my hand this 4th day of May 1918.

PAUL O. NOBLE.